United States Patent
Kayi et al.

(10) Patent No.: US 12,112,200 B2
(45) Date of Patent: Oct. 8, 2024

(54) PIPELINE PARALLEL COMPUTING USING EXTENDED MEMORY

(71) Applicant: International Business Machines Corporation, Armonk, NY (US)

(72) Inventors: Abdullah Kayi, Westchester, NY (US); Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 17/473,428

(22) Filed: Sep. 13, 2021

(65) Prior Publication Data

US 2023/0080480 A1 Mar. 16, 2023

(51) Int. Cl.
G06F 9/50 (2006.01)
G06N 3/08 (2023.01)

(52) U.S. Cl.
CPC ............... G06F 9/50 (2013.01); G06N 3/08 (2013.01)

(58) Field of Classification Search
CPC ........................................................ G06F 9/50
See application file for complete search history.

(56) References Cited

U.S. PATENT DOCUMENTS

| | | |
|---|---|---|
| 5,058,049 A | 10/1991 | Anderson |
| 5,522,045 A | 5/1996 | Sandberg |
| 5,588,132 A | 12/1996 | Cardoza |
| 5,822,784 A | 10/1998 | Garney |
| 5,893,922 A | 4/1999 | Baylor et al. |
| 5,909,540 A | 6/1999 | Carter et al. |
| 6,148,377 A | 11/2000 | Carter et al. |
| 6,240,501 B1 | 5/2001 | Hagersten |
| 6,336,177 B1 | 1/2002 | Stevens |
| 6,510,496 B1 | 1/2003 | Tarui et al. |
| 6,574,721 B1 | 6/2003 | Christenson et al. |
| 7,302,513 B2 | 11/2007 | Mouttet |
| 7,340,546 B2 | 3/2008 | Moll et al. |
| 7,398,259 B2 | 7/2008 | Nugent |
| 7,525,833 B2 | 4/2009 | Snider et al. |
| 7,587,431 B1 | 9/2009 | Rao et al. |

(Continued)

FOREIGN PATENT DOCUMENTS

| | | |
|---|---|---|
| CN | 110276450 A | 9/2019 |
| EP | 3252617 | 12/2017 |

(Continued)

OTHER PUBLICATIONS

K. M. Greenan et al., "Reliability Mechanisms for File Systems using Non-Volatile Memory as a Metadata Store," Workshop on Embedded Stems Security, Oct. 22-25, 2006, 10 pages.

(Continued)

*Primary Examiner* — Charlie Sun
(74) *Attorney, Agent, or Firm* — Samuel Waldbaum; Ryan, Mason & Lewis, LLP

(57) ABSTRACT

A system comprises compute nodes distributed over a network and configured to perform a pipeline parallel process. The system also comprises an extended memory comprising a global virtual address space which is shared by the compute nodes. The extended memory is configured to enable the compute nodes to exchange data over the network when the compute nodes perform the pipeline parallel process.

20 Claims, 10 Drawing Sheets

(56) References Cited

U.S. PATENT DOCUMENTS

| | | |
|---|---|---|
| 7,680,987 B1 | 3/2010 | Clark et al. |
| 7,702,743 B1 | 4/2010 | Wong |
| 7,805,575 B1 | 9/2010 | Agarwal et al. |
| 7,890,633 B2 | 2/2011 | St. Pierre et al. |
| 7,902,867 B2 | 3/2011 | Mouttet |
| 8,117,418 B1 | 2/2012 | Metcalf et al. |
| 8,150,805 B1 | 4/2012 | Tawri et al. |
| 8,204,860 B1 | 6/2012 | Ferguson et al. |
| 8,391,049 B2 | 3/2013 | Jo |
| 8,510,244 B2 | 8/2013 | Carson et al. |
| 8,539,164 B2 | 9/2013 | Warner et al. |
| 8,731,071 B1 | 5/2014 | Kimura |
| 8,732,386 B2 | 5/2014 | O'Krafka et al. |
| 8,825,984 B1 | 9/2014 | Srinivasan et al. |
| 8,832,009 B2 | 9/2014 | Rose et al. |
| 8,862,832 B1 | 10/2014 | Cartmell et al. |
| 8,874,853 B2 | 10/2014 | Cantin et al. |
| 8,918,587 B2 | 12/2014 | Bronson et al. |
| 9,003,164 B2 | 4/2015 | Chinya et al. |
| 9,041,389 B2 | 5/2015 | Gokem et al. |
| 9,092,736 B2 | 7/2015 | Aparin et al. |
| 9,176,980 B2 | 11/2015 | Ananthanarayanan et al. |
| 9,183,148 B2 | 11/2015 | Fried et al. |
| 9,203,022 B2 | 12/2015 | Hopstaken et al. |
| 9,274,890 B2 | 3/2016 | Gladwin et al. |
| 9,389,273 B2 | 7/2016 | Gokmen et al. |
| 9,400,306 B2 | 7/2016 | Gokmen et al. |
| 9,411,717 B2 | 8/2016 | Goss et al. |
| 9,443,997 B2 | 9/2016 | Gokmen et al. |
| 9,514,055 B2 | 12/2016 | Haines et al. |
| 9,601,546 B1 | 3/2017 | Ando et al. |
| 9,608,160 B1 | 3/2017 | Bayram et al. |
| 9,612,757 B2 | 4/2017 | Chakrabarti |
| 9,645,943 B2 | 5/2017 | Kopylovitz et al. |
| 9,646,243 B1 | 5/2017 | Gokmen |
| 9,659,249 B1 | 5/2017 | Copel |
| 9,705,974 B2 | 7/2017 | Reddy et al. |
| 9,715,656 B1 | 7/2017 | Gokmen |
| 9,740,616 B2 | 8/2017 | Busaba et al. |
| 9,779,355 B1 | 10/2017 | Leobandung |
| 9,852,790 B1 | 12/2017 | Gokmen et al. |
| 9,887,351 B1 | 2/2018 | Ando et al. |
| 9,997,704 B2 | 6/2018 | Ando et al. |
| 10,079,341 B1 | 9/2018 | Bedell et al. |
| 10,096,773 B1 | 10/2018 | Ando et al. |
| 10,115,800 B1 | 10/2018 | Kim et al. |
| 10,134,472 B1 | 11/2018 | Leobandung et al. |
| 10,141,509 B2 | 11/2018 | Ando et al. |
| 10,153,159 B1 | 12/2018 | Kim et al. |
| 10,186,657 B2 | 1/2019 | Brew et al. |
| 10,229,021 B1 | 3/2019 | Iwamitsu et al. |
| 10,248,907 B2 | 4/2019 | Gokmen et al. |
| 10,296,459 B1 | 5/2019 | Jayasimha et al. |
| 10,303,655 B1 | 5/2019 | Bigman |
| 10,332,509 B2 | 6/2019 | Catanzaro et al. |
| 10,373,051 B2 | 8/2019 | Gokmen et al. |
| 10,402,697 B2 | 9/2019 | Yang et al. |
| 10,459,852 B1 | 10/2019 | Michaud |
| 10,540,588 B2 | 1/2020 | Burger et al. |
| 10,740,671 B2 | 8/2020 | Gokmen |
| 10,956,815 B2 | 3/2021 | Gokmen |
| 11,016,908 B2 | 5/2021 | Johns et al. |
| 11,687,356 B2 * | 6/2023 | Lu ............... G06F 9/44505 718/1 |
| 2002/0013889 A1 | 1/2002 | Schuster et al. |
| 2002/0042868 A1 | 4/2002 | Godtland et al. |
| 2002/0078308 A1 | 6/2002 | Altman et al. |
| 2003/0009640 A1 * | 1/2003 | Arimilli ............. G06F 12/0813 711/147 |
| 2003/0204670 A1 | 10/2003 | Holt et al. |
| 2005/0071625 A1 | 3/2005 | Schwartz et al. |
| 2005/0160226 A1 | 7/2005 | Averill et al. |
| 2005/0172099 A1 | 8/2005 | Lowe |
| 2007/0022256 A1 | 1/2007 | Cantin et al. |
| 2007/0038837 A1 | 2/2007 | Ben-Zvi |
| 2007/0079072 A1 | 4/2007 | Collier et al. |
| 2007/0260821 A1 | 11/2007 | Zeffer et al. |
| 2008/0086620 A1 | 4/2008 | Morris |
| 2008/0089110 A1 | 4/2008 | Robinett et al. |
| 2008/0140932 A1 | 6/2008 | Flynn et al. |
| 2008/0140971 A1 | 6/2008 | Dankel et al. |
| 2008/0301256 A1 | 12/2008 | McWilliams et al. |
| 2009/0089537 A1 | 4/2009 | Vick et al. |
| 2009/0150511 A1 | 6/2009 | Gross et al. |
| 2009/0240869 A1 | 9/2009 | O'Krafka et al. |
| 2010/0115228 A1 | 5/2010 | Parker et al. |
| 2010/0118041 A1 | 5/2010 | Chen et al. |
| 2011/0153533 A1 | 6/2011 | Jackson et al. |
| 2012/0023296 A1 | 1/2012 | Yan et al. |
| 2012/0259889 A1 | 10/2012 | Dinker et al. |
| 2013/0103836 A1 | 4/2013 | Baniqued et al. |
| 2013/0232296 A1 | 9/2013 | Yonezawa et al. |
| 2013/0262553 A1 | 10/2013 | Ito et al. |
| 2014/0013074 A1 | 1/2014 | Koka et al. |
| 2014/0115228 A1 | 4/2014 | Zhou et al. |
| 2014/0156576 A1 | 6/2014 | Nugent |
| 2014/0172937 A1 | 6/2014 | Linderman et al. |
| 2014/0215121 A1 | 7/2014 | Ordentlich et al. |
| 2014/0237321 A1 | 8/2014 | Gold |
| 2015/0012679 A1 | 1/2015 | Davis et al. |
| 2015/0036920 A1 | 2/2015 | Wu et al. |
| 2015/0106314 A1 | 4/2015 | Birdwell et al. |
| 2015/0170025 A1 | 6/2015 | Wu et al. |
| 2015/0171868 A1 | 6/2015 | Rodriquez et al. |
| 2015/0220129 A1 | 8/2015 | Miwa |
| 2015/0254129 A1 | 9/2015 | Authement et al. |
| 2015/0294219 A1 | 10/2015 | Krizhevsky |
| 2015/0347306 A1 | 12/2015 | Gschwind |
| 2015/0347897 A1 | 12/2015 | Modha |
| 2015/0379395 A1 | 12/2015 | Pickett |
| 2016/0049195 A1 | 2/2016 | Yu et al. |
| 2016/0080495 A1 | 3/2016 | Bilas et al. |
| 2016/0117587 A1 | 4/2016 | Yan et al. |
| 2016/0148078 A1 | 5/2016 | Shen et al. |
| 2016/0162782 A1 | 6/2016 | Park |
| 2016/0306709 A1 | 10/2016 | Shaull |
| 2017/0061281 A1 | 3/2017 | Gokmen et al. |
| 2017/0092358 A1 | 3/2017 | Adams et al. |
| 2017/0109626 A1 | 4/2017 | Gokmen et al. |
| 2017/0109628 A1 | 4/2017 | Gokmen et al. |
| 2017/0116132 A1 | 4/2017 | Mealey et al. |
| 2017/0124025 A1 | 5/2017 | Gokmen |
| 2017/0193002 A1 | 7/2017 | Shvachko et al. |
| 2017/0220474 A1 | 8/2017 | Dice et al. |
| 2017/0235499 A1 | 8/2017 | Xu et al. |
| 2017/0285997 A1 | 10/2017 | Stabrawa et al. |
| 2018/0005110 A1 | 1/2018 | Gokmen et al. |
| 2018/0075338 A1 | 3/2018 | Gokmen |
| 2018/0075350 A1 | 3/2018 | Gokmen |
| 2018/0089559 A1 | 3/2018 | Copel |
| 2018/0113649 A1 | 4/2018 | Shafiee Ardestani et al. |
| 2018/0218257 A1 | 8/2018 | Xu et al. |
| 2018/0253642 A1 | 9/2018 | Gokmen et al. |
| 2018/0300617 A1 | 10/2018 | McBride et al. |
| 2018/0322382 A1 | 11/2018 | Mellempudi et al. |
| 2019/0012762 A1 | 1/2019 | Koker et al. |
| 2019/0018786 A1 | 1/2019 | Beard et al. |
| 2019/0340500 A1 | 11/2019 | Olmschenk |
| 2020/0159669 A1 | 5/2020 | Duncan et al. |
| 2020/0183836 A1 | 6/2020 | Johns et al. |
| 2020/0183840 A1 | 6/2020 | Johns et al. |
| 2020/0183854 A1 | 6/2020 | Johns et al. |
| 2020/0183859 A1 | 6/2020 | Johns et al. |
| 2020/0192799 A1 | 6/2020 | Johns et al. |
| 2020/0364094 A1 | 11/2020 | Kahle et al. |
| 2021/0142153 A1 | 5/2021 | Gokmen et al. |

FOREIGN PATENT DOCUMENTS

| | | |
|---|---|---|
| JP | H05282272 A | 10/1993 |
| JP | H07121498 A | 5/1995 |

(56) References Cited

FOREIGN PATENT DOCUMENTS

| | | |
|---|---|---|
| JP | H07319507 A | 12/1995 |
| WO | 2016030230 A1 | 3/2016 |

OTHER PUBLICATIONS

J. S. Chase et al., "Sharing and Protection in a Single Address Space Operating System," ACM Transactions on Computer Systems, vol. 12, No. 4, Nov. 1994, pp. 271-307.
D. Gelernter, "Generative Communication in Linda," ACM Transactions on Programming Languages and Systems, vol. 7, No. 1, Jan. 1985, pp. 80-112.
A. Dearle et al., "Grasshopper—A Persistent Operating System for Conventional Hardware," Proceedings, Second International Workshop on Object Orientation in Operating Systems, Oct. 1992, 5 pages.
C. Docan et al., "DataSpaces: An Interaction and Coordination Framework for Coupled Simulation Workflows," ACM International Symposium on High Performance Distributed Computing, Jun. 2010, 12 pages.
N. Carriero et al., "Linda in Context," Communications of the ACM, Apr. 1989, vol. 32, No. 4, pp. 444-458.
H. H. Litz, "Improving the Scalability of High Performance Computer Systems," Diplom-Informaliker de Technischen Informalik, Mannheim, Germany, 2010, 196 pages.
UPC Consortium, UPC Language Specifications V1.2, A publication of the UPC Consortium, May 31, 2005, 129 pages.
C.-C. Tu et al., "Secure I/0 Device Sharing among Virtual Machines on Multiple Hosts," the 40th Annual International Symposium on Computer Architecture, ISCA '13, Tel-Aviv, Israel, Jun. 23-27, 2013, pp. 108-119.
C. Amza et al, "Treadmarks: Shared Memory Computing on Networks of Workstations," Computer, vol. 29, No. 2, Feb. 1996, 20 pages.
L. Schlesinger et al., "Consistency Based Snapshot Management in Data Grids," VLDB PhD Workshop, 2003, 5 pages.
Y. Zheng et al., "UPC++: A PGAS Extension for C++," 2014 IEEE 28th International Parallel and Distributed Processing Symposium, Phoenix, AZ., May 2014, 10 pages.
T. P. Morgan, "3Leaf Makes Big SMPs out of x64 Clusters," The Register, https://www.theregister.com/2009/11/03/3leaf_ddc_launch/, Nov. 3, 2009, 10 pages.
K. Li et al., "Memory Coherence in Shared Virtual Memory Systems," ACM Transactions on Computer Systems, vol. 7, No. 4, Nov. 1989, pp. 321-359.
Wikipedia, "Interrupt," https://en.wikipedia.org/wiki/Interrupt, Aug. 20, 2021, 10 pages.
J. K. Bennett et al., "Munin: Distributed Shared Memory Based on Type-Specific Memory Coherence," In PPOPP Proceedings of the Second ACM SIGPLAN Symposium on Principles & Practice of Parallel Programming, Mar. 1990, pp. 168-176.
B. N. Bershad et al., "Midway: Shared Memory Parallel Programming with Entry Consistency for Distributed Memory Multiprocessors," Technical Report CMU-CS-91-170, Carnegie Mellon University, Sep. 1991, 20 pages.
A. Sutterud, "Designing a Virtual Memory System for the SHMAC Research Infrastructure," Norwegian University of Science & Technology, Aug. 2017, 43 pages.
L. Chua, "Resistance Switching Memories are Memristors," Applied Physics A, vol. 102, Jan. 28, 2011, pp. 765-783.
Y. Shan et al., "Distributed Shared Persistent Memory," Proceedings of the 2017 Symposium on Cloud Computing, Sep. 24-27, 2017, 15 pages.
B. Li et al., "Training Itself: Mixed-Signal Training Acceleration for Memristor-Based Neural Network," 19th Asia and South Pacific Design Automation Conference, Jan. 2014, 6 pages.
Y. V. Pershin et al., "Solving Mazes with Memristors: A Massively Parallel Approach," Physical Review E, vol. 84, No. 4, Oct. 2011, 12 pages.
S. H. Jo et al., "Nanoscale Memristor Device as Synapse in Neuromorphic Systems," American Chemical Society Nano Letters, vol. 10, 2010, pp. 1297-1301.
F. Alibart et al., "Pattern Classification by Memristive Crossbar Circuits Using Ex Situ and In Situ Training," Nature Communications, Jun. 25, 2013, pp. 1-7.
X. Wu et al., "A Cmos Spiking Neuron for Brain-Inspired Neural Networks With Resistive Synapses and In-Situ Learning," IEEE Transactions on Circuits and Systems II: Express Briefs, vol. 62, No. 1, Nov. 2015, 6 pages.
J. Misra et al., "Artificial Neural Networks in Hardware: A Survey of Two Decades of Progress," Neurocomputing, vol. 74, Issues 1-3, Dec. 2010, 43 pages.
S. Kim et al., "Analog CMOS-based Resistive Processing Unit for Deep Neural Network Training," Computer Science—Emerging Technologies, Jan. 20, 2017, 4 pages.
D. Stutz, "Understanding Convolutional Neural Networks," Seminar Report, Aug. 30, 2014, 23 pages.
S. Hamdioui et al., "Memristor for Computing: Myth or Reality?" Proceedings of the Conference on Design, Automation & Test in Europe, 2017, pp. 722-731.
D. Bruening et al., "Practical Memory Checking with Dr. Memory," IEEE Symposium on Code Generation, Apr. 2011, 11 pages.
D. Soudry et al., "Memristor-Based Multilayer Neural Networks with Online Gradient Descent Training," IEEE Transactions on Neural Networks and Learning System, 2015, 14 pages.
T. Gokmen et al., "Training LSTM Networks with Resistive Cross-Point Devices," IBM Research AI, Jun. 2018, 17 pages.
B. D. Fleisch et al., "Mirage: A Coherent Distributed Shared Memory Design," In 12th SOSP Proceedings of the Twelfth ACM symposium on Operating Systems Principles, 1989, pp. 211-223.
Disclosed Anonymously, "An FPGA Architecture for Accelerating Convolutional Neural Network In Speech Recognition," IP.com Prior Art Database Technical Disclosure: IPCOM000247151D, Aug. 11, 2016, 5 pages.
IBM, "Apparatus for Computer Input/Output Architecture When IO Speed Exceed Processing Speed in The Order of Magnitudes," IP.com Prior Art Database Technical Disclosure: IPCOM000179651D, Feb. 19, 2009, 5 pages.
Disclosed Anonymously, "Efficient Resource Identification Management Scheme Across Independent but Related Resource Pools in a Hierarchical Resource Scenario of a Switch Assembly System," IP.com Prior Art Database Technical Disclosure: IPCOM000245533D, Mar. 16, 2016, 26 pages.
G. Indiveri et al., "Integration of Nanoscale Memristor Synapses in Neuromorphic Computing Architectures," Nanotechnology, vol. 24, 2013, pp. 1-13.
Disclosed Anonymously, "System State Replay Over Time," IP.com Prior Art Database Technical Disclosure: IPCOM000206003D, Apr. 11, 2011, 4 pages.
C.-C. Tu, "Memory-Based Rack Area Networking," Stony Brook University, May 2014, 113 pages.
V. K. Chippa et al., "StoRM: A Stochastic Recognition and Mining Processor," 2014 International Symposium on Low Power Electronics and Design, 2014, pp. 39-44.
C. Lehmann et al., "A Generic Systolic Array Building Block for Neural Networks with On-Chip Learning," IEEE Transactions on Neural Networks, vol. 4, No. 3, 1993, pp. 400-407.
Disclosed Anonymously, "A Novel Data Prefetch Method under Heterogeneous Architecture," IP.com Prior Art Database Technical Disclosure: IPCOM000224167D, Dec. 12, 2012, 14 pages.
X. Qiu et al., "Moving Address Translation Closer to Memory in Distributed Shared-Memory Multiprocessors," IEEE Transactions on Parallel and Distributed Systems, vol. 16, No. 7, Jul. 2005, pp. 612-623.
T. Gokem et al., "Acceleration of Deep Neural Network Training with Resistive Cross-Point Devices: Design Considerations," Frontiers in Neuroscience, vol. 10, No. 333, Jul. 2016, 13 pages.
T. Gokem et al., "Training Deep Convolutional Neural Networks with Resistive Cross-Point Devices," Frontiers in Neuroscience, vol. 11, No. 538, Oct. 2017, 13 pages.
A. Harlap et al., "PipeDream: Pipeline Parallelism for DNN Training," SysML, Feb. 2018, 3 pages.

(56) References Cited

OTHER PUBLICATIONS

P. Mell et al., "The NIST Definition of Cloud Computing," Recommendations of the National Institute of Standards and Technology, Special Publication 800-145, Sep. 2011, 7 pages.

List of IBM Patents or Patent Applications Treated as Related.

Quinn et al., "Network Based Coherency: Extending a Processor's Coherency Domain Over a Standard Network," 3LeafSystems, Presentation at Hot Chips 20: A Symposium on High Performance Chips, Aug. 2008, 22 pages.

Anonymously, "An Apparatus for Leveraging General Purpose Graphics Processing Units for JSON Accelerating in Front-End Cache," ip.com, No. IPCOM000234730D, Jan. 2014, 6 pages.

Ramya Moanakrishnan, "What is a Computer Network? Definition, Objectives, Components, Types, and Best Practices," Spiceworks Inc. (2023), available at https://www.spiceworks.com/tech/networking/articles/what-is-a-computer-network/, May 17, 2023, 19 pages.

Margaret Rouse, "What Does Network Adapter Mean?," Technopedia, available at https://www.techopedia.com/definition/8546/network-adapter, Jul. 28, 2021, 3 pages.

Margaret Rouse, "What Does Bus Mean?," Technopedia, available at https://www.techopedia.com/definition/2162/bus#:~:text=A%20bus%is%20a%20subsystem,may%20be%20parallel%20or%20serial, May 26, 2023, 2 pages.

IBM, "Expanding Track State Possibilities of Global Metadata Tracks to Improve Access," ip.com, No. IPCOM000124563D, Apr. 2005, 2 pages.

* cited by examiner $y = W \times x$

FORWARD PASS $z = W^T \times \delta$

BACKWARD PASS $w_{ij} \leftarrow w_{ij} + \eta x_i \times \delta_j$

WEIGHT UPDATE

600

700

PIPELINE PARALLEL COMPUTING USING EXTENDED MEMORY

BACKGROUND

This disclosure relates generally to pipeline parallel computing and, more particularly, to neuromorphic computing techniques for implementing pipeline model parallel training of artificial neural networks using accelerator devices such as analog resistive processing unit devices. Information processing systems such as neuromorphic computing systems and artificial neural network systems are utilized in various applications such as machine learning and inference processing for cognitive recognition and computing. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of resistive processing unit (RPU) cells having tunable resistive memory devices (e.g., tunable conductance), wherein the conductance states of the RPU cells are encoded or otherwise mapped to the synaptic weights.

SUMMARY

Exemplary embodiments of the disclosure include systems, computer program products, and methods for implementing pipeline parallel computing using extended memory. For example, in an exemplary embodiment, a system comprises compute nodes distributed over a network and configured to perform a pipeline parallel process. The system also comprises an extended memory comprising a global virtual address space which is shared by the compute nodes. The extended memory is configured to enable the compute nodes to exchange data over the network when the compute nodes perform the pipeline parallel process.

Other embodiments will be described in the following detailed description of exemplary embodiments, which is to be read in conjunction with the accompanying figures.

DETAILED DESCRIPTION

Figure 1:
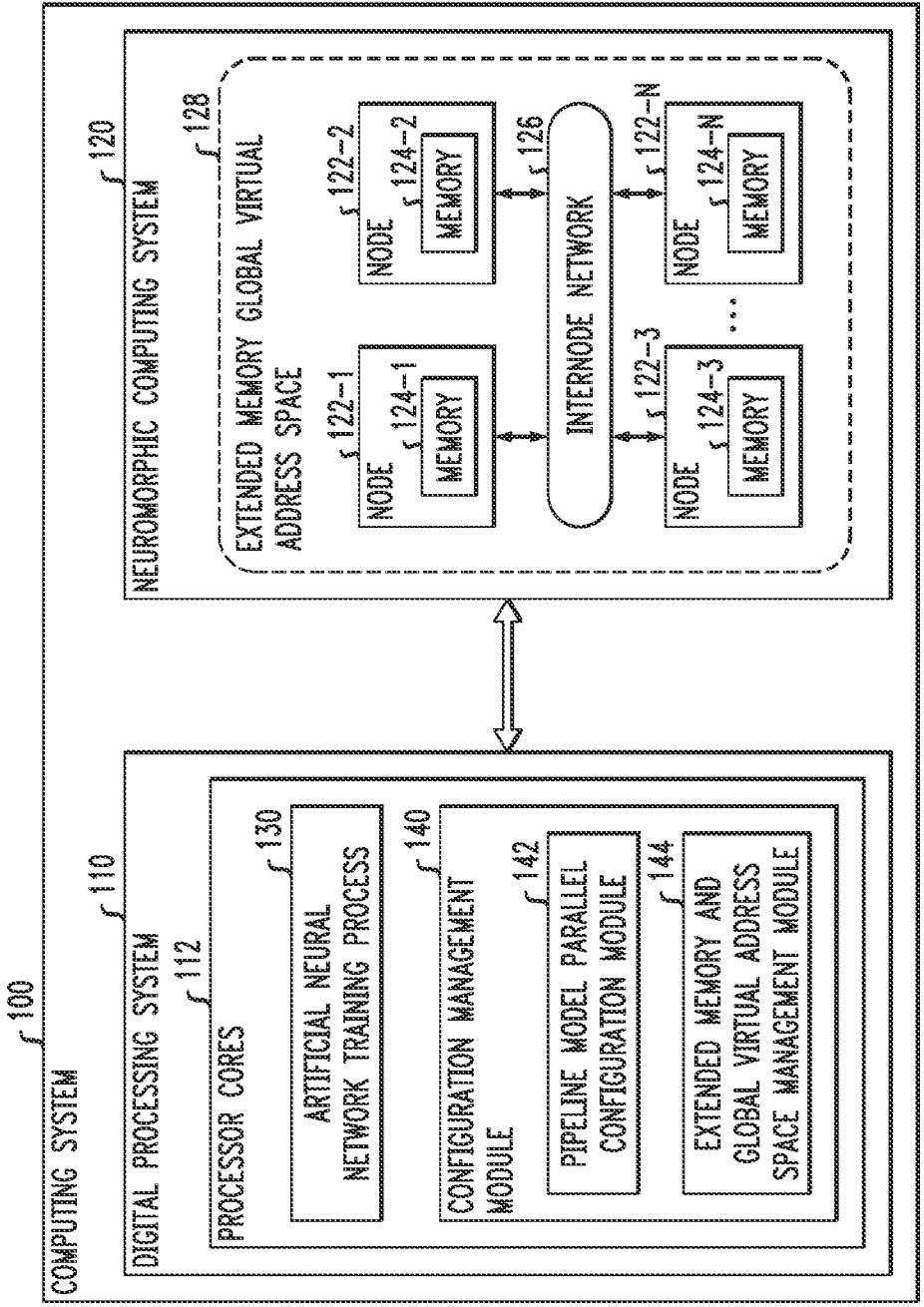
FIG. 1 schematically illustrates a computing system which is configured to perform pipelined model parallel training of an artificial neural network using a network of hardware accelerator devices and extended memory, according to an exemplary embodiment of the disclosure.

Embodiments of the disclosure will now be described in detail with regard to systems and methods to implement distributed pipeline parallel computing using compute nodes that are distributed over a network, and an extended memory which comprises a global virtual address space that is shared by the compute nodes. The extended memory is configured to enable the compute nodes to exchange data over the network when the compute nodes perform the pipeline parallel process. While the exemplary embodiments and techniques disclosed herein can be implemented to perform distributed pipeline parallel computing for various applications, for purposes of illustration, exemplary embodiments will be described in the context of distributed compute nodes (e.g., accelerator devices) which are configured to implement an artificial neural network in a model parallel configuration, and which are configured to execute a pipeline model parallel training process to train the artificial neural network.

There are various model training methods that can be implemented to train an artificial neural network such as a Deep Neural Network (DNN), Convolutional Neural Network (CNN), a Recurrent Neural Network (RNN), a Long Short-Term Memory (LSTM) neural network, etc. Such model training methods generally include data parallel training methods (data parallelism) and model parallel training methods (model parallelism), which can be implemented using accelerator devices such as resistive processing unit (RPU) devices, graphics processing unit (GPU) devices, Field-Programmable Gate Array (FPGA) devices, Microprocessing Unit (MPU) devices, etc.

With data parallelism, each device (e.g., GPU device) comprises a full copy of a given model being trained (e.g., all layers of a DNN) and processes a different set of training data, and computes a respective set of gradients. The gradients are aggregated (via a parameter server), and the aggregated gradients are broadcasted to all devices to update weights. Data parallelism suffers from excessive inter-device communication overhead, because the weights that are updated at each individual device need to be synchronized. This communication overhead increases as the model size increases, which significantly limits the scalability of data parallelism.

On the other hand, model parallelism partitions a given model among multiple devices (e.g., RPUs, GPUs), wherein each device is responsible for the weight updates of the assigned model layers. In this regard, the amount of data communicated among devices in a model parallel configuration is significantly less than a data parallel configuration. Furthermore, model parallelism enables training large models which exceed a size constraint limited by the memory capacity of the given accelerator device. In some instances, model parallelism involves partitioning the layers of a given model between multiple devices or nodes, and creating an efficient pipeline to train the model across these devices to maximize device utilization. In this regard, to enable pipeline model parallel execution, multiple mini-batches of training data are injected to the pipeline concurrently, which allows each device to process different mini-batches simultaneously.

It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., ASICs, FPGAs, etc.), processing devices (e.g., CPUs, GPUs, etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

FIG. 1 schematically illustrates a computing system which is configured to perform pipelined model parallel training of an artificial neural network using a network of hardware accelerator devices and extended memory, according to an exemplary embodiment of the disclosure. In particular, FIG. 1 schematically illustrates a computing system 100 which comprises a digital processing system 110, and a neuromorphic computing system 120. The digital processing system 110 comprises a plurality of processor cores 112. The neuromorphic computing system 120 comprises a distributed system comprising a plurality of compute nodes 122-1, 122-2, 122-3, . . . , 122-N (collectively, compute nodes 122, or neural cores 122) which are distributed and interconnected over a network 126 (e.g., internode network 126). The network 126 can be implemented using any suitable network infrastructure and network communications protocol including, but not limited to, Ethernet, InfiniBand, etc. with optimizations for enabling an extended memory architecture 128 and associated global virtual address space across the distributed, network-connected nodes 122. In some embodiments, the compute nodes 122-1, 122-2, 122-3, . . . , 122-N comprise homogenous hardware accelerator devices such as RPU devices, or GPU devices, etc. In some embodiments, the compute nodes 122-1, 122-2, 122-3, . . . , 122-N comprise heterogeneous hardware accelerator/processor devices including a combination of RPU devices, GPU devices, FPGA devices, MPU devices, etc.

In some embodiments, the compute nodes 122-1, 122-2, 122-3, . . . , 122-N comprise respective local memory devices 124-1, 124-2, 124-3, . . . , 124-N (collectively, memory devices 124). In some embodiments, the memory devices 124 comprise volatile memory such as dynamic random-access memory (DRAM), and non-volatile memory (NVM) devices and technologies such as storage class memory (SCM), flash-based memory, solid-state drive (SSD) devices, high-bandwidth memory (HBM), etc. In some embodiments, as explained in further detail below, the computing system 100 configures and implements the extended memory (EM) architecture 128 which allows each node 122 to access at least a portion (shared portions) of the local memory devices 124 of other nodes 122 of the neuromorphic computing system 120 (and other external nodes) through a global virtual address space using unique global virtual address pointers.

It is to be noted that the term "extended memory," while not limited thereto, illustratively refers to a memory system which (i) comprises a virtual memory pool that is implemented using portions of local memory of different nodes which are distributed over an internode network, and which (iii) implements a global virtual address space and unique global virtual address pointers, which allow each node of the distributed system to access the virtual memory pool either locally (if the data physically resides in a local memory of the node) or remotely through the internode network (if the data physically resides in a remote memory of a remote node). With the extended memory architecture, the same global virtual address space pointer is valid with a same value on all distributed nodes in the system which contribute portions of their local memory to the extended memory and associated global virtual address space.

In some embodiments, the digital processing system 110 performs various methods through execution of program code by the processor cores 112. For example, the digital processing system 110 executes an artificial neural network training process 130 to train an artificial neural network model that is implemented by an allocated set of nodes 122 of the neuromorphic computing system 120. The training process involves training synaptic weight matrices of an artificial neural network, wherein the synaptic weight matrices are stored in, e.g., RPU arrays of RPU devices of the nodes 122. In some embodiments, the artificial neural network training process 130 implements a backpropagation process for training an artificial neural network model. As is known in the art, the backpropagation process comprises three repeating processes including (i) a forward process, (ii) a backward process, and (iii) a model parameter update process.

During the training process, training data are randomly sampled into mini-batches, and the mini-batches are input to the model to traverse the model in two phases: forward and backward passes. The forward pass generates predictions and calculates errors between the predictions and the ground truth. The backward pass backpropagates errors through the model to obtain gradients to update model weights. The forward and backward cycles mainly involve performing matrix-vector multiplication in forward and backward directions. The weight update involves calculating a vector-vector outer product which consists of a multiplication operation and an incremental weight update to be performed locally in each resistive memory cell within a given RPU array. The processing of a given mini-batch via the forward and backward phases is referred to as an iteration, and an epoch is defined as performing the forward-backward pass through an entire training dataset. The training process iterates multiple epochs until the model converges to a convergence criterion. In some embodiments, a stochastic gradient descent (SGD) process is utilized to train artificial neural networks using the backpropagation method in which an error gradient with respect to each model parameter (e.g., weight) is calculated using the backpropagation algorithm. An exemplary training process will be described in further detail below in conjunction with, e.g., FIGS. 5A, 5B, and 5C.

Further, the digital processing system 110 implements a configuration management module 140 which comprises a pipeline model parallel configuration module 142, and an extended memory and global virtual address space management module 144. In general, the configuration management module 140 implements methods for provisioning and configuring various nodes 122 and associated memory 124 of the neuromorphic computing system 120 to implement an artificial neural network which can be trained using a pipelined model parallel process. In some embodiments, the configuration management module 140 communicates with a programming interface of the neuromorphic computing system 120 to configure one or more nodes and a routing system of the neuromorphic computing system 120 to allocate and configure one or more neural cores to implement interconnected RPU arrays for implementing synaptic weight matrices for various layers of an artificial neural network model.

In particular, the pipeline model parallel configuration module 142 implements methods for, e.g., (i) provisioning and configuring the nodes 122 and associated local memories 124 of the neuromorphic computing system 120 to partition layers of a given artificial neural network model across various devices (e.g., accelerator devices) of the nodes 122, and (ii) implementing a pipelined model parallel training process by constructing an efficient computation schedule where different devices/nodes of the neuromorphic computing system 120 can perform forward pass and backward pass operations of the training process for different data samples at the same time. The pipeline model parallel configuration module 142 receives model configuration information, e.g., a computational graph of the models, sizes of model parameters and activations, resource constraints, etc., and utilizes the model configuration information to determine an optimal configuration for partitioning the model across various devices/nodes of the neuromorphic computing system 120.

The extended memory and global virtual address space management module 144 implements methods for configuring and managing the extended memory 128 which provides a global virtual address space that allows the nodes 122 of the neuromorphic computing system 120 to store data, communicate, and coordinate process flow for executing a pipelined model parallel training process. As noted above, the extended memory is implemented by pooling at least a portion of each local memory device 124 of the nodes 122 that are allocated and provisioned to implement an artificial neural network model. The extended memory and global virtual address space management module 144 assigns each model layer a portion of the global virtual address space, and the nodes that are assigned to the model layers utilize the corresponding portions of the global virtual address space to store processing results for access by a next (upstream) model layer during a forward pass operation, and to access data generated by a downstream model layer during a backward pass operation. The pipeline model parallel configuration module 142 allocates and schedules pipelined workflow over the nodes that implement various model layers of a given artificial neural network, while the extended memory and global virtual address space management module 144 assigns portions of the shared global virtual address space to the different model layers and, thus, to the nodes that are assigned to the model layers.

In this regard, the global virtual address space model provides applications with a common virtual address space for all threads and processes running in a system. The model provides byte addressability of any shared virtual address mapped into virtual addresses of the processes. Each process uses the same virtual address mapping which allows for pointer dereferencing to work independent of where the physical memory resides or where the thread is running. In other words, the global virtual address space memory model implemented by the extended memory architecture provides an application (e.g., process running on node) with a shared virtual address view for memory that is distributed across various accelerator devices/nodes units in the system. For each node, the global virtual address space memory model provides byte addressability of local physical memory of the node, as well as physical memory located on remote nodes, and allows the sharing of global virtual address pointers between processes running on different nodes.

In some embodiments, the extended memory system 128 implements a global virtual address directory which maps a plurality of global virtual addresses (of the global virtual address space) to the plurality of nodes 122. When a given node 122 needs to access data that is stored in the extended memory system (global virtual memory) at a given global virtual address, the given node (e.g., operating system of the node) will retrieve, from the global virtual address directory, a target node (or home node) associated with the given global virtual address, and access the data corresponding to the given global virtual address from the target node. In some embodiments, the translation from the global virtual address to the physical memory address is performed locally on the target node. In some embodiments, the extended memory system 128 provides direct load/store access to memory located within a node. The load/store method provides direct access to memory distributed across the nodes (extended memory), wherein data moves directly between a memory location and registers of a processor or device.

In some embodiments, the extended memory and global virtual address space management module 144 implements methods for configuring and managing the extended memory and associated global virtual address space and global virtual address directory using the exemplary systems and methods disclosed in the following U.S. patent applications: (i) Ser. No. 16/217,257, filed on Dec. 12, 2018, entitled "Global Virtual Address Space Consistency Model"; (ii) Ser. No. 16/214,799, filed Dec. 10, 2018, entitled "Identifying Location of Data Granules in Global Virtual Address Space"; and (iii) U.S. Ser. No. 16/214,597, filed Dec. 10, 2018, entitled "Caching Data From Remote Memories," which are all commonly assigned, and the disclosures of which are fully incorporated herein by reference. In addition, these applications disclose various methods for implementing a memory consistency model, and an extended cache memory framework, for the extended memory system 128.

The memory consistency model maintains consistency of data that is stored in the global virtual address space of the extended memory 128 to prevent, e.g., a given node or process from reading and utilizing stale data. In some embodiments, memory consistency model is implemented using a "snapshot" consistency model as disclosed in the above-incorporated patent applications. The snapshot-based memory consistency model is configured to maintain a consistent view of the global virtual memory by, e.g., establishing a version of the memory associated with the set of shared memory regions at a given point in time (or snapshot of memory). A control process can generate a snapshot using a library call to create the snapshot for a list of global virtual address ranges and provide access to the exposed version of the shared memory to a set of processes. Each process or thread is then allowed to create a new version of the shared memory snapshot that is only visible to that process or thread. The new version is created when a process modifies a location within the snapshot region. Furthermore, the new version may only include the modified shared memory. The control process can then create a new consistent version by consolidating the modifications performed by all the exposed processes.

Further, the extended cache memory framework, as disclosed in the above-incorporated patent applications, implements methods for providing a memory caching infrastructure which supports virtual addressing by utilizing a local system memory in a local node as a cache of remote memories. This extended cache memory architecture allows a given node to fetch data, which is stored in a given global virtual address on a remote node, and store the data in local cache memory associated with the given node.

Figure 2:
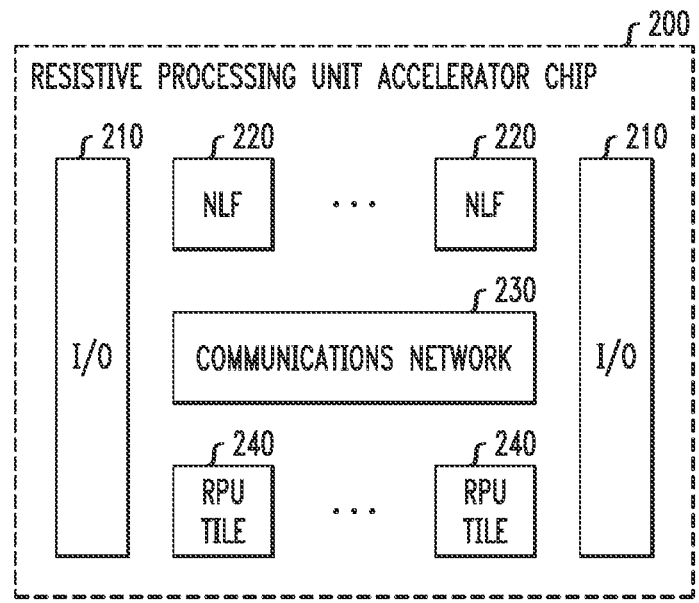
FIG. 2 schematically illustrates a resistive processing unit accelerator device which can be implemented in the system of FIG. 1, according to an exemplary embodiment of the disclosure.

As noted above, the nodes 122 of the neuromorphic computing system 120 can implement homogenous or heterogenous hardware processor/acceleration devices. In some embodiments, the nodes 122 of the neuromorphic computing system 120 implement RPU accelerator devices and/or RPU compute nodes. For example, FIG. 2 schematically illustrates a resistive processing unit accelerator device 200 (or RPU accelerator chip 200) which can be implemented in the system of FIG. 1, according to an exemplary embodiment of the disclosure. In some embodiments, one or more of the nodes 122 of the neuromorphic computing system 120 of FIG. 1 comprises one or more of the RPU accelerator devices 200 shown in FIG. 2. The RPU accelerator device 200 comprises an I/O interface 210, a plurality of non-linear function (NLF) compute modules 220, an intranode communications network 230, and a plurality of RPU tiles 240.

The I/O interface 210 comprises circuitry to enable off-chip I/O communication. Each of the RPU tiles 240 comprises an array RPU cells (or RPU array) with peripheral circuits that support the parallel operation of the RPU array in all three cycles of the backpropagation training process. The peripheral circuitry comprises analog-to-digital converters, digital-to-analog converters, drivers, etc. An exemplary embodiment of the RPU tiles 240 will be described in further detail below with reference to FIG. 4. The signals that are output from an RPU tile are directed toward a non-linear function (NLF) circuit that calculates either activation functions (i.e., sigmoid, softmax) and their derivatives as well as arithmetical operations (i.e., multiplication) depending on cycle type and on position of corresponding layer. At the tile boundary, input signals to the NLF are bounded to a certain threshold value to avoid signal saturation. For example, for neurons in hidden layers, the NLF compute modules 220 may compute a sigmoid activation function. Neurons at an output layer, may perform a softmax NLF operation. The communications network 230 enables on-chip communication through a bus or any suitable network-on-chip (NoC) communications framework.

Figure 3:
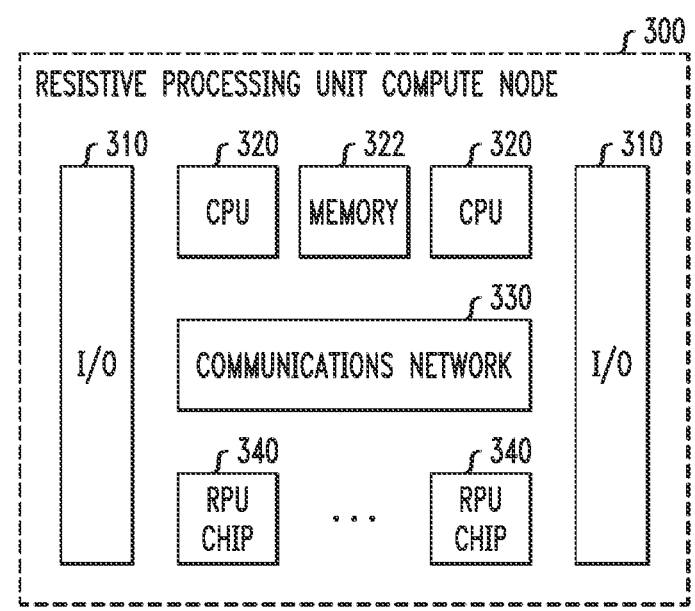
FIG. 3 schematically illustrates a resistive processing unit compute node comprising a plurality resistive processing unit accelerator device, which can be implemented in the system of FIG. 1, according to an exemplary embodiment of the disclosure.

FIG. 3 schematically illustrates a resistive processing unit compute node 300 comprising a plurality of resistive processing unit accelerator devices, which can be implemented in the system of FIG. 1, according to an exemplary embodiment of the disclosure. In some embodiments, one or more of the nodes 122 of the neuromorphic computing system 120 of FIG. 1 comprises a RPU compute node 300 shown in FIG. 3. The RPU compute node 300 comprises I/O interfaces 310, one or more processors 320 (e.g., CPUs), memory 322, a communications network 330, and one or more RPU chips 340. In some embodiments, each RPU chip 340 comprises the RPU accelerator device 200 of FIG. 2.

Figure 4:
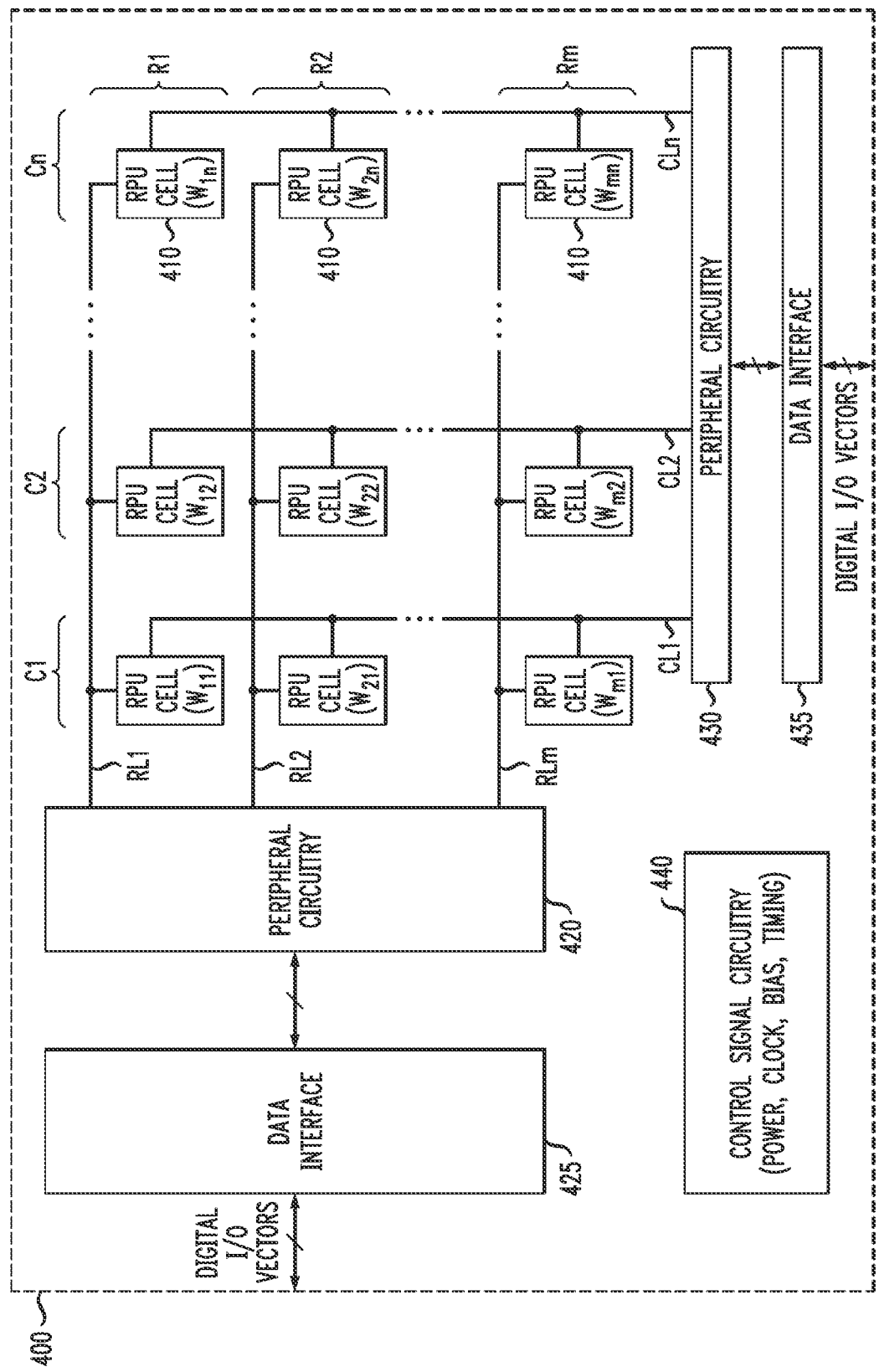
FIG. 4 schematically illustrates a resistive processing unit accelerator device which can be utilized to train an artificial neural network, according to an exemplary embodiment of the disclosure.

FIG. 4 schematically illustrates a resistive processing unit system 400 which can be implemented in the system of FIG. 1, according to an exemplary embodiment of the disclosure. In some embodiments, FIG. 4 schematically illustrates an exemplary embodiment of the RPU tiles 240 of the RPU device 200 of FIG. 2. The RPU system 400 comprises a two-dimensional (2D) crossbar array of RPU cells 410 (alternatively referred to as RPU array) arranged in a plurality of rows R1, R2, . . . , Rm, and a plurality of columns C1, C2, . . . , Cn. The RPU cells 410 in each row R1, R2, . . . , Rm are commonly connected to respective row control lines RL1, RL2, . . . , RLm (collectively, row control lines RL). The RPU cells 410 in each column C1, C2, . . . , Cn are commonly connected to respective column control lines CL1, CL2, . . . , CLn (collectively, column control lines CL). Each RPU cell 410 is connected at (and between) a cross-point (or intersection) of a respective one of the row and column control lines. In an exemplary embodiment, the number of rows (m) and the number of columns (n) are the same (i.e., n=m). For example, in some embodiments, the RPU system 400 comprises a 4,096×4,096 array of RPU cells 410.

The RPU system 400 further comprises peripheral circuitry 420 connected to the row control lines RL1, RL2, . . . , RLm, as well peripheral circuitry 430 connected to the column control lines CL1, CL2, . . . , CLn. Further, the peripheral circuitry 420 is connected to a data input/output (I/O) interface block 425, and the peripheral circuitry 430 is connected to a data I/O interface block 435. The RPU system 400 further comprises control signal circuitry 440 which comprises various types of circuit blocks such as power, clock, bias and timing circuitry to provide power distribution and control signals and clocking signals for operation of the peripheral circuitry 420 and 430.

In some embodiments, each RPU cell 410 in the RPU system 400 comprises a resistive element with a conductance value that is tunable. For a neural network model, the RPU cells 410 in the given RPU array comprise respective conductance values that are mapped to respective synaptic weight values of a weight matrix W for a given layer of the neural network model, which is stored in the array of RPU cells 410. In some embodiments, the resistive elements of the RPU cells 410 are implemented using resistive memory devices such as resistive switching devices (interfacial or filamentary switching devices), ReRAM, memristor devices, (phase-change material (PCM) device, etc.) and other types of devices which have a tunable conductance (or tunable resistance level) which can be programmatically adjusted within a range of a plurality of different conductance levels to tune the weight of the RPU cell 410. In some embodiments, the variable conductance elements of the RPU cells 410 can be implemented using ferroelectric devices such as ferroelectric field-effect transistor devices. Furthermore, in some embodiments, the RPU cells 410 can be implemented using an analog CMOS-based framework in which each RPU cell 410 comprises a capacitor and a read transistor. With the analog CMOS-based framework, the capacitor serves as a memory element of the RPU cell 410 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

While the row control lines RL and column control lines CL are each shown in FIG. 4 as a single line for ease of illustration, it is to be understood that each row and column control line can include two or more control lines connected to the RPU cells 410 in the respective rows and columns, depending on the implementation and the specific architecture of the RPU cells 410. For example, in some embodiments, each row control line RL can include a complementary pair of word lines for a given RPU cell 410. Moreover, each column control line CL may comprise multiple control lines including, e.g., one or more source lines (SL) and one or more bit lines (BL).

The peripheral circuitry 420 and 430 comprises various circuit blocks which are connected to the respective rows and columns in the 2D array of RPU cells 410, and which are configured to perform various analog, in-memory computation operations such as vector-matrix multiply functions, matrix-vector multiply functions, and outer product update operations, etc., to provide hardware accelerated computation operations as discussed herein. For example, in some embodiments, to support RPU cell read/sensing operations (e.g., read a weight value of a given RPU cell 410), the peripheral circuitry 420 and 430 comprises pulse-width modulation (PWM) circuitry and read pulse driver circuitry, which is configured to generate and apply PWM read pulses to the RPU cells 410 in response to digital input vector values (read input values) received during different operations. More specifically, in some embodiments, the peripheral circuitry 420 and 430 comprises digital-to-analog (D/A) converter circuitry that is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values which are represented by output currents, wherein the stored weights/values of the RPU cells 410 are essentially read out by measuring the output currents.

The peripheral circuitry 420 and 430 further comprises current integrator circuitry and analog-to-digital (A/D) converter circuitry to integrate read currents ($I_{READ}$) which are output and accumulated from the connected RPU cells 410 and convert the integrated currents into digital values (read output values) for subsequent computation. In particular, the currents generated by the RPU cells 410 are summed on the columns (or rows) and the summed current is integrated over a measurement time, tmeas, by current readout circuitry of the peripheral circuitry 420 and 430. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

The data I/O interfaces 425 and 435 are configured to interface with a digital processing core, wherein the digital processing core is configured to process input/outputs to the RPU system 400 (e.g., neural core) and route data between different RPU arrays. The data I/O interfaces 425 and 435 are configured to (i) receive external control signals and data from a digital processing core and provide the received control signals and data to the peripheral circuitry 420 and 430, and (ii) receive digital read output values from peripheral circuitry 420 and 430, and send the digital read output values to a digital processing core for processing. In some embodiments, the digital processing cores implement non-linear function circuitry which calculates activation functions (e.g., sigmoid neuron function, softmax, etc.) and other arithmetical operations on data that is to be provided to a next or previous layer of an artificial neural network.

The RPU system 400 of FIG. 4 can be configured to operate as an in-memory computing system or computational memory system in which an RPU array is utilized for a dual purpose of storing data and processing the data to perform some computational tasks. As noted above, neuromorphic computing systems and artificial neural network systems are types of in-memory computing systems in which artificial neurons are connected using artificial synaptic devices to provide synaptic weights which represent the strength of connection between two artificial neurons. The synaptic weights can be implemented using tunable resistive memory devices, wherein the variable conductance states are used to represent the synaptic weights and to perform computations (e.g., matrix-vector multiplication operations). The conductance states of the analog resistive memory devices are encoded or otherwise mapped to synaptic weights.

More specifically, in an exemplary embodiment, the array of RPU cells 410 of the RPU system 400 of FIG. 4 comprise artificial synaptic devices which connect artificial pre-synaptic neurons (e.g., artificial neurons of an input layer or hidden layer of the artificial neural network) and artificial post-synaptic neurons (e.g., artificial neuron of a hidden layer or output layer of the artificial neural network), wherein the artificial synaptic devices provide synaptic weights that represent connection strengths between the pre-synaptic and post-synaptic neurons. As shown in FIG. 4, the weights $W_{ij}$ (where i denotes the row index and j denotes the column index) are in the form of a matrix.

As noted above, various types of artificial neural networks, such as deep neural networks and convolutional neural networks implement neuromorphic computing architectures for machine learning applications such as image recognition, object recognition, speech recognition, etc. The in-memory computations associated with such neural networks include, e.g., training computations in which the synaptic weights of the resistive memory cells are optimized by processing a training dataset, and forward inference computations in which the trained neural networks are used to process input data for purposes of, e.g., classifying the input data, predicting events based on the input data, etc.

DNN training generally relies on a backpropagation algorithm which includes three repeating cycles: a forward pass, a backward pass, and a weight update, which are repeated many times until a convergence criterion is met. The forward and backward cycles mainly involve performing matrix-vector multiplication in forward and backward directions through the layers of the artificial neural network. The weight update involves calculating a vector-vector outer product which consists of a multiplication operation and an incremental weight update to be performed locally in each resistive memory cell within the RPU array. As is known in the art, fully connected DNNs comprise stacks of fully connected layers such that a signal propagates from an input layer to an output layer by going through series of linear and non-linear transformations. The entire DNN expresses a single differentiable error function that maps the input data to class scores at the output layer. Typically, a DNN is trained using a simple stochastic gradient decent (SGD) scheme, in which an error gradient with respect to each parameter is calculated using the backpropagation algorithm.

When training an artificial neural network that is implemented (at least in part) using RPU devices such as shown in FIG. 1, as data moves forward through the network, vector matrix multiplications are performed, wherein the hidden neurons/nodes take the inputs, perform a non-linear transformation, and then send the results to the next weight matrix. This process continues until the data reaches the output neurons/nodes. The output neurons/nodes evaluate the classification error, and then propagate this classification error back in a manner similar to the forward pass, which results in a vector matrix multiplication being performed in the opposite direction. For each data set, when the forward pass and backward pass are completed, a weight update is performed. Essentially, each weight will be updated proportionally to the input to that weight as defined by the input neuron/node and the error computed by the neuron/node to which it is connected.

Figure 5A:
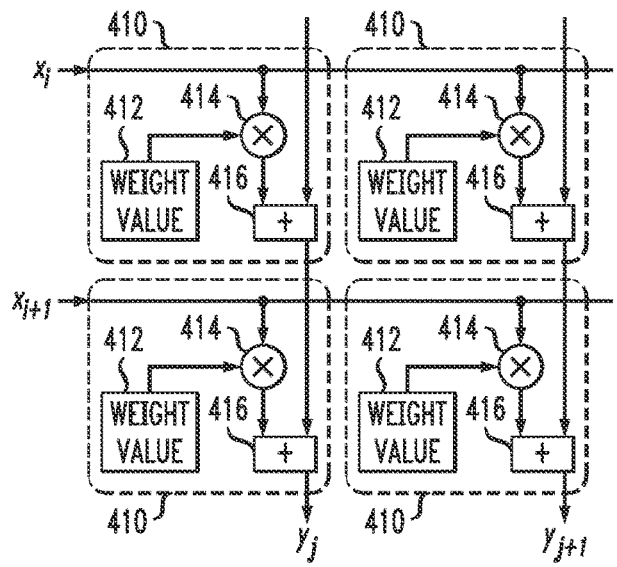
FIGS. 5A, 5B, and 5C schematically illustrate respective forward pass, backward pass, and weight update operations of an exemplary training process for training synaptic weights of an artificial neural network using the systems of FIGS. 1 and 2, according to an exemplary embodiment of the disclosure.
Figure 5B:
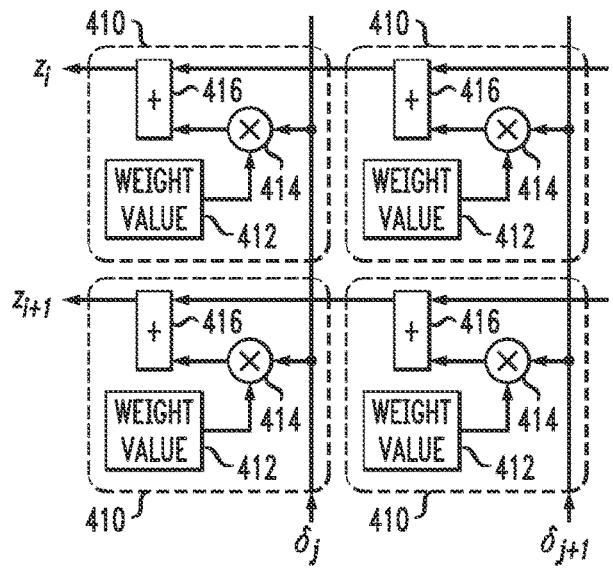
Figure 5C:
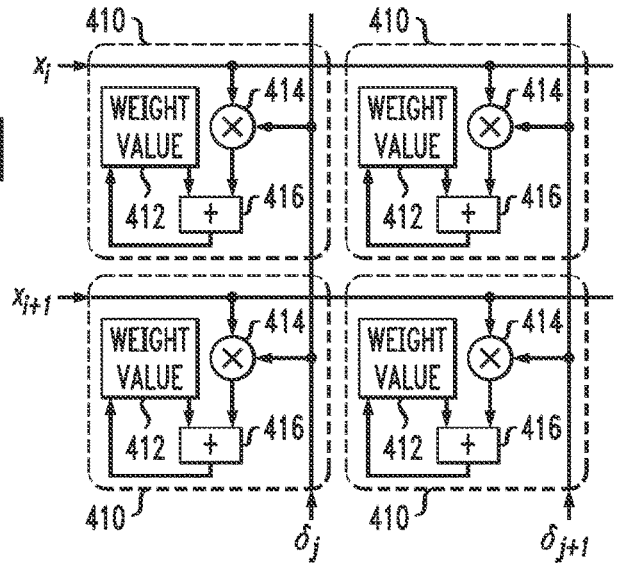

More specifically, FIGS. 5A, 5B, and 5C schematically illustrate respective forward pass, backward pass, and weight update operations of an exemplary training process for training synaptic weights of an artificial neural network using the systems of FIGS. 1 and 4, according to an exemplary embodiment of the disclosure. For illustrative purposes, FIGS. 5A, 5B, and 5C schematically illustrate components of each RPU cell 410 in the RPU array of FIG. 4. In particular, each RPU cell 410 comprises a matrix element 412 (or weight value) of a given matrix W stored in the RPU array. The matrix elements 412 represent matrix values of the given matrix W, wherein the matrix values are mapped to conductance values of the RPU cells 410 such that the matrix elements 412 stored in the RPU cells 410 are encoded by the respective conductance values of the RPU cells 410. In particular, the conductance values $g_{ij}$ in the RPU array form a matrix W of weight values $w_{ij}$. Each RPU cell 410 is configured to perform a local multiplication operation 414 and a local summation operation 416 to support the forward pass, backward pass, and weight update operations of a training process to train the weight values 412 stored in the RPU cells 410 of the RPU array.

The forward pass operation for training an artificial neural network is performed to calculate neuron activations of a downstream layer (e.g., hidden layer or output layer) based on (i) neuron activations of an upstream layer (e.g., input layer or hidden layer) and (ii) the synaptic weights that connect the neurons of the upstream layer to the neurons of the downstream layer. For a single fully connected layer where, e.g., n input neurons are connected to m output (or hidden) neurons, the forward pass cycle (FIG. 5A) involves computing a matrix-vector multiplication y=Wx, where the vector x of length n, i.e., $x=[x_1, x_2, \ldots, x_n]$ represents the activities of the input neurons (e.g., upstream neuron excitation) and the matrix W of size m×n stores the weight values between each pair of input and output neurons. The resulting digital output vector y of length m, $y=y_1, y_2, \ldots y_m$, is further processed by performing a non-linear activation on each of the elements and then transmitted to the next downstream layer to continue the forward propagation operation. As data propagates forward through the neural network, vector-matrix multiplications are performed, wherein the hidden neurons/nodes take the inputs, perform a non-linear transformation, and then send the results to the next weight matrix. This process continues until the data reaches an output layer (of the artificial neural network) comprising output neurons/nodes. The output neurons/nodes evaluate classification errors, and generate classification error signals S which are propagated back through the neural network using backward pass operations. The error signals S can be determined as a difference between the results of the forward inference classification (estimated labels) and the correct labels at the output layer of the artificial neural network.

As schematically shown in FIG. 5B, the backward pass operation for training the artificial neural network is performed in a manner that is similar to the forward pass operation (FIG. 5A) except that a vector of error signals $\delta=[\delta_1, \delta_2, \ldots, \delta_n]$ is backpropagated from the output layer to the input layer of the artificial neural network. The backward pass cycle (FIG. 5B) on a single layer also involves a matrix-vector multiplication on the transpose of a weight matrix, $z=W^T\delta$, where $W^T$ denotes the transpose of the weight matrix W, where the vector $\delta$ of length m represents the error calculated by the output neurons, and where the vector z of length n is further processed using the derivative of neuron non-linearity and then passed down to the previous layer. The digital output signal $z=z_1, z_2, \ldots, z_n$ is then processed and transmitted to the next upstream layer to continue the backward propagation operation. The backward propagation process continues until the error signals reach the input layer of the artificial neural network.

After the backward pass operation is completed on a given RPU array which stores a given synaptic weight matrix W, a weight update process (as schematically shown in FIG. 5C) is performed to tune the conductance values of the RPU cells of the given RPU array (and thus update the weight values of the given synaptic weight matrix W) based on the forward-propagated digital signals $x_1, x_2, \ldots, x_n$, and the backward-propagated digital error signals $\delta_1, \delta_2, \ldots, \delta_n$, that were previously input to the given RPU array during the forward and backward pass operations. Once the error signal values (or delta values) have been integrated for a given neuron layer, that layer is ready for weight update. The update process that is performed on the given RPU array can be pipelined with the backward propagation of the error vector δ through additional upstream layers of the neural network. In some embodiments, the backward propagation from the first hidden layer back to the input layer is performed, but not required as the neurons in the input layer have no upstream synapses, so the highest layer that uses the δ error values is the first hidden layer.

More specifically, as schematically shown in FIG. 5C, the weight update operation involves updating the weight matrix W in the given RPU array by performing an outer product of the two vectors that are used in the forward and the backward cycles. In particular, implementing the weight update for the given RPU array involves performing a vector-vector outer product operation which consists of a multiplication operation 414 and an incremental weight update to be performed locally in each RPU cell 410, i.e., $w_{ij} \leftarrow w_{ij} + \eta x_i \times \delta_j$, where $w_1$ represents the weight value for the $i^{th}$ row and the $j^{th}$ column (for simplicity layer index is omitted), where $x_i$ is the activity at the input neuron, $\delta_j$ is the error computed by the output neuron, and where denotes a global learning rate.

In some embodiments, to determine the product of the xi and δj vectors for the weight update operation, stochastic translator circuitry in the peripheral circuitry 420 and 430 can be utilized to generate stochastic bit streams that represent the input vectors xi and δj. The stochastic bits streams for the vectors xi and δj are fed through rows and columns in the RPU array, wherein the conductance of a given RPU cell 410 will change depending on the coincidence of the xi and δj stochastic pulse streams input to the given RPU cell 410. The vector cross product operations for the weight update operation are implemented based on the known concept that coincidence detection (using an AND logic gate operation) of stochastic streams representing real numbers is equivalent to a multiplication operation. All three operating modes described above allow the RPU cells of the synaptic weight arrays of the artificial neural network to be active in all three cycles and, thus, enable a very efficient implementation of the backpropagation algorithm to compute updated weight values of the RPU cells during a DNN training process.

In some embodiments where signed weights or complex matrices are implemented (e.g., a complex matrix which comprises a real part and an imaginary part), the RPU framework of FIG. 4 can be implemented to store real and imaginary matrix values in two distinct RPU arrays. For example, in an exemplary embodiment, a first RPU array can be configured to store the real matrix values of a complex matrix, while a corresponding second RPU array is configured to store the imaginary matrix values of the complex matrix. In this manner, the respective parts can then be processed separately, making it possible to obtain a conjugate transpose A* and a pseudoinverse A\. In some embodiments, each RPU cell can be implemented using two adjacent unit cells on the same RPU array (e.g., two adjacent unit cells from two adjacent rows of the same RPU array). In such configuration, the control lines of the RPU array would be configured to support such RPU cell configuration, as is understood by those of ordinary skill in the art.

Figure 6:
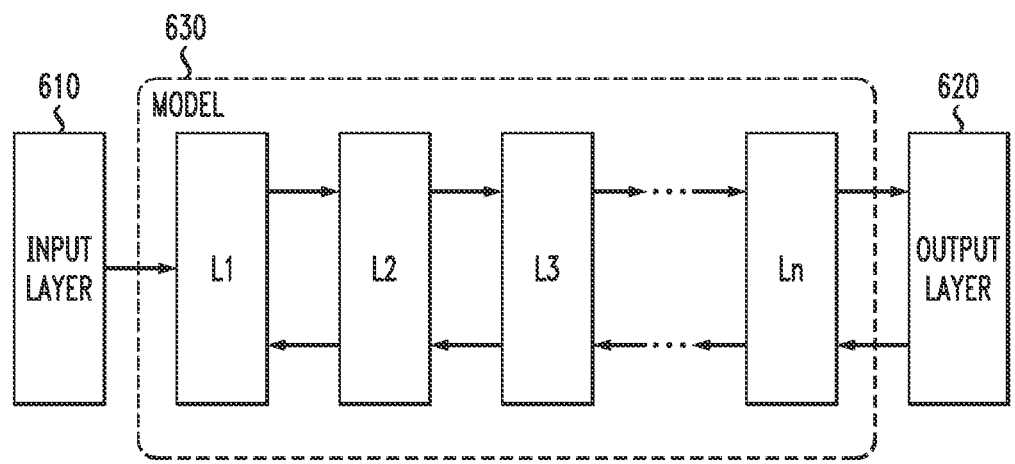
FIG. 6 schematically illustrates a framework of an artificial neural network which can be trained using a pipelined model parallel training process, according to an exemplary embodiment of the disclosure.

FIG. 6 schematically illustrates a framework of an artificial neural network 600 which can be trained using a pipelined model parallel training process, according to an exemplary embodiment of the disclosure. The artificial neural network 600 comprises a plurality of layers including an input layer 610, an output layer 620, and a plurality of model layers 630 (e.g., L1, L2, L3, . . . , Ln) between the input and output layer 610 and 620. The input layer 610 of the artificial neural network 600 comprises artificial input neurons, which receive the initial data that is input to the artificial neural network for further processing by subsequent model layers 630 of artificial neurons. The model layers 630 (or hidden layers) perform various computations, depending on type and framework of the artificial neural network 600. The output layer 620 (e.g., classification layer) implements an activation function and produces the classification/predication results for given inputs.

The artificial neural network 600 can be a feed-forward neural network (e.g., a deep neural network with multiple hidden layers or a convolution neural network) or a recurrent neural network (e.g., LSTM network). Depending on the type of neural network, the model layers 630 of the artificial neural network 600 can include functional layers including, but not limited to, fully connected (FC) layers, activation layers, convolutional layers, pooling layers, normalization layers, etc. As is known in the art, an FC layer in a neural network is a layer in which all the inputs from the layer are connected to every activation unit of the next layer. An activation layer in a neural network comprises activation functions which define how a weighted sum of an input is transformed into an output from a node or nodes in a layer of the network. For example, activation functions include, but are not limited to, a rectifier or ReLU activation function, a sigmoid activation function, a hyperbolic tangent (tan H) activation function, softmax activation function, etc.

A convolutional layer applies a "convolution operation" to an input dataset and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a deep learning model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

In the exemplary embodiment of FIG. 6, arrows are shown between layers of the neural network model 600 to schematically illustrate forward and backward pass operations of a neural network training process that is implemented using the backpropagation algorithm as discussed above. The arrows that point to the right indicate a forward pass operation that processes data from the input layer 610 to the output layer 620, while the arrows that point to the left indicate a backward pass operation which propagates error gradients back through the neural network model 600 from the output layer 620 to the input layer 610.

For a model parallel configuration, the artificial neural network model 600 can be partitioned into N portions, where each portion of the artificial neural network model 600 is implemented on a corresponding one of N nodes. For example, the input layer 610 and first hidden layer L1 can be implemented on a first node, the last hidden layer Ln and the output layer 620 can be implemented on a second node, the second and third hidden layers L2 and L3 can be implemented on a third node, and other layers between L3 and Ln can be divided and implemented on one or more additional nodes. For example, assuming the artificial neural network model 600 includes 50 layers, the artificial neural network model 600 can be partitioned into 10 portions (each comprising 5 successive layers), where each portion is implemented on a corresponding one of 10 nodes. In some embodiments, each layer of the artificial neural network 600 can be implemented on a separate node.

Figure 7:
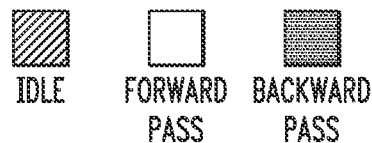
FIG. 7 schematically illustrates a pipelined model parallel training process using a plurality of compute nodes, according to an exemplary embodiment of the disclosure.
Figure 7:
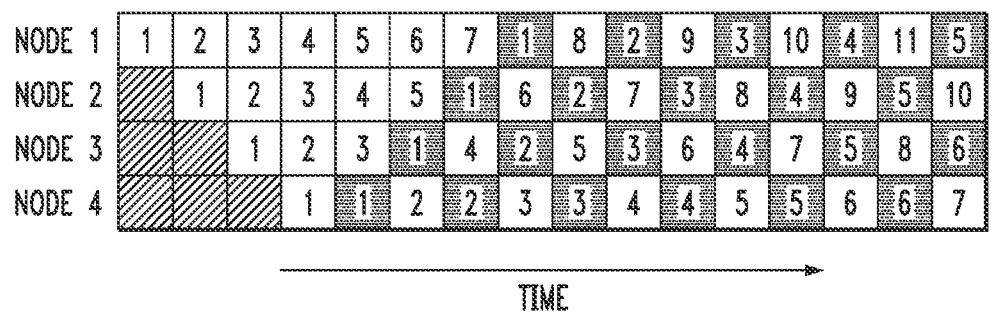

The artificial neural network model 600 can be trained using a pipelined model parallel training process, such as shown in FIG. 7. In particular, FIG. 7 schematically illustrates a pipelined model parallel training process 700 using a plurality of compute nodes, according to an exemplary embodiment of the disclosure. For illustrative purposes, it is assumed that the artificial neural network model 600 (FIG. 6) is partitioned into four (4) portions, wherein each of the four portions is implemented by one node of an allocated set of fours node, Node 1, Node 2, Node 3, and Node 4. In addition, for ease of illustration, FIG. 7 schematically illustrates an exemplary timeline of pipelined model parallel training for a plurality (i) of mini-batches of data (for i=1, 2, 3, 4, 5, 6, 7, 8, 9, 10, 11). The different shading of the boxes in FIG. 7 illustrates different operations of the nodes (e.g., idle state, forward pass, backward pass) that are performed on each of the $i^{th}$ mini-batches over time. With training performed in the pipelined matter, multiple mini-batches are processed in the pipeline in a bi-directional manner, wherein each mini-batch flows through the pipeline (forward pass) from the first node N1 to the fourth node N4, and then back through the pipeline from the fourth node N4 to the first node N1. For example, as shown in FIG. 7, a first mini-batch (i=1) is received and processed by the nodes N1, N2, N3, and N4 in sequence. When the first node N1 is finished forward processing the first mini-batch (i=2), the second mini-batch (i=2) is input to the first node N1 for forward processing.

As noted above, to implement a pipelined model parallel training process for an artificial neural network model such as shown in FIG. 7, intermediate data needs to be temporarily stored and transferred between the different nodes that implement the different layers/portions of the artificial neural network model. In accordance with exemplary embodiments of the disclosure, a pipelined model parallel training process is performed using extended memory which implements a global virtual address space that is shared among a set of nodes performing the pipelined model parallel training process to thereby store and access intermediate data that is generated by the various nodes during the training process.

Figure 8:
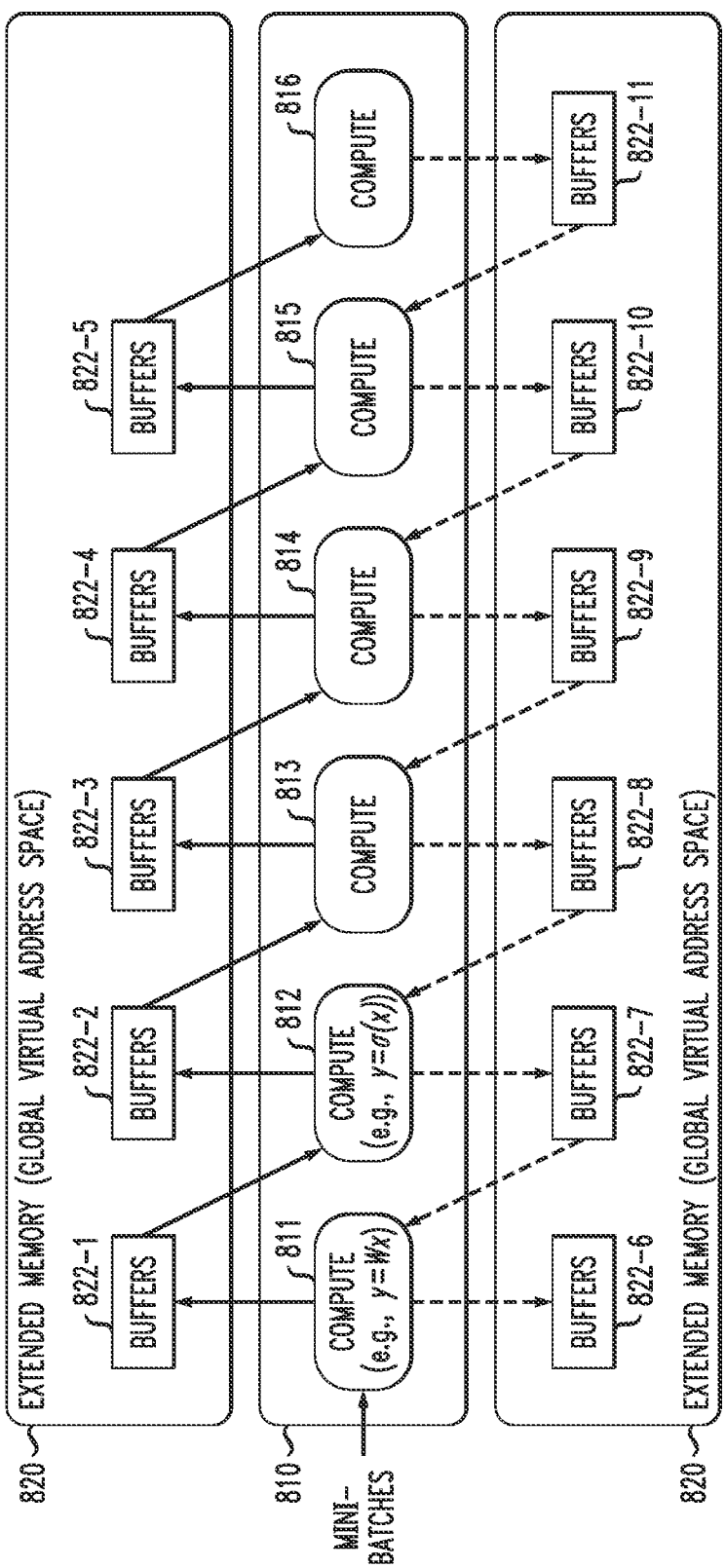
FIG. 8 schematically illustrates a pipelined model parallel training process using a plurality of compute nodes and extended memory, according to an exemplary embodiment of the disclosure.

For example, FIG. 8 schematically illustrates a pipelined model parallel training process using a plurality of compute nodes and extended memory, according to an exemplary embodiment of the disclosure. More specifically, FIG. 8 schematically illustrates a model parallel system configuration 800 comprising a plurality of nodes 810, and an extended memory 820 comprising a global virtual address space that is shared by the plurality of nodes 810. For ease of illustration, FIG. 8 shows an exemplary artificial neural network model which comprises five (5) hidden layers 811, 812, 813, 814, and 815 which perform respective compute functions, and an output layer 816 which performs a compute function. For example, the hidden layer 811 may be configured to perform a matrix-vector multiplication compute operation (y=Wx) for a forward and backward pass operation, and the hidden layer 812 may be configured to perform a suitable activation function computation (y=σ(x)) for a forward and backward pass operation. The layers 813, 814, 815, and 816 can implement any type of computation that is needed to implement the given layer of the given neural network model. The plurality of nodes 810 can include any number of nodes which implement different portions (e.g., layers) of the artificial neural network. For example, in some embodiments, each layer 811, 812, 813, 814, 815, and 816 can be implemented on a different node. In some embodiments, each node can implement two layers where, e.g., layers 811 and 812 are implemented on a first node, layers 813 and 814 are implemented on a second node, and layers 815 and 816 are implemented on a third node.

Further, the extended memory 820 comprises a plurality of buffers 822-1, 822-2, 822-3, 822-4, 822-5, 822-6, 822-7, 822-8, 822-9, 822-10, and 822-11 (collectively, buffers 822). The extended memory 820 comprises a global virtual address space which comprises virtual memory that is shared by the various compute nodes 810 which implement the model layers 811-816. As noted above, the virtual memory is configured by pooling portions of the physical memory of the nodes 810, and allocating ranges of virtual addresses for each of the buffers. The extended memory 820 is configured for data read and data write operations using global virtual address pointers. With this scheme, the global virtual address space and associated buffers 822 can be configured according to program code based on the specification of the artificial neutral network to be trained, and the pipeline model parallel execution process, irrespective of the actual nodes that are allocated to implement the artificial neutral network and execute the pipeline model parallel execution process.

In particular, FIG. 8 schematically illustrates a pipeline model parallel process flow wherein forward pass operations (and associated data store and data read operations to the extended memory 820) are shown by solid arrows, and wherein backward pass operations (and associated data store and data read operations to the extended memory 820) are shown by dashed arrows. During a forward pass operation, the intermediate data (compute results) generated by the layers 811, 812, 813, 814, and 815 are stored in respective buffers 822-1, 822-2, 822-3, 822-4, and 822-5, respectively, and then subsequently read by each next downstream layer 812, 813, 814, 815, and 816, respectively. During a backward pass operation, the intermediate data (compute results) generated by the layers 816, 815, 814, 813, 812, and 811 are stored in respective buffers 822-11, 822-10, 822-9, 822-8, 822-7, and 822-8, respectively, and then subsequently read by each next upstream layer 815, 814, 813, 812, and 811, respectively. During execution of the pipeline process, the node that implements a given model layer can send a global virtual address pointer to the next node which points to the global virtual address of the buffer which contains the intermediate data that is needed by the next node to continue the pipeline processing.

Figure 9:
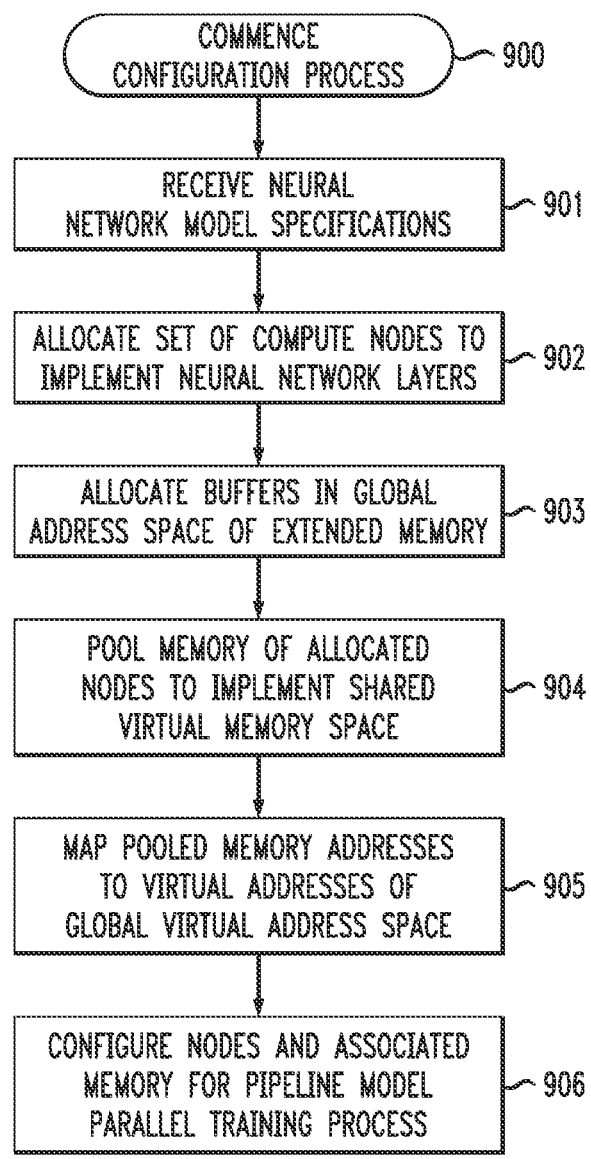
FIG. 9 is a flow diagram of a method for configuring a neuromorphic computing system to implement a pipelined model parallel training process using a plurality of compute nodes and extended memory, according to an exemplary embodiment of the disclosure.

FIG. 9 is a flow diagram of a method for configuring a neuromorphic computing system to implement a pipelined model parallel training process using a plurality of compute nodes and extended memory, according to an exemplary embodiment of the disclosure. In some embodiments, FIG. 9 illustrates an exemplary mode of operation of the configuration management module 140 of FIG. 1 when a configuration process is commenced 900. The configuration management module 140 receives specification of the neural network model to be trained (block 901). A set of compute nodes is allocated to implement the layers of the neural network model (block 902). The allocation is based, in part, on the number of layers, the size of the model (e.g., size of layers and parameters), etc., to achieve a sufficient model parallel implementation in which the layers of the model are assigned to different devices or nodes for efficient pipeline model parallel training to train the model across these devices to maximize GPU utilization.

The configuration management module 140 allocates buffers in a global virtual address space of extended memory to enable transfer of intermediate data between the layers of the model (block 903). The size and number of buffers for each layer will depend on, e.g., the size of the layer, the type of computation performed by the layer, etc. The configuration management module 140 pools the physical memory of the allocated nodes to implement a shared virtual memory space (block 904), and maps physical addresses of the pooled memory to the virtual addresses of the allocated buffers in the global virtual address space of the extended memory (block 905). The configuration management module 140 then proceeds to communicate with the neuromorphic computing system to configure the nodes and associated memory for execution of the pipeline model parallel training process to train the given artificial neural network (block 906).

It is to be appreciated that the use of the extended memory architecture and the associated global virtual address space allows the computing system (e.g., system 100 of FIG. 1) to be a scalable system in which the number and/or types of the compute nodes (e.g., compute nodes 122) can be scaled/changed independent of the executable program code for performing the pipeline parallel process, and independent of the global virtual address space of the extended memory. As noted above, with the extended memory architecture, the buffers of the global virtual address space of the extended memory are allocated based on the specifications (e.g., size and number of layers) of the given artificial neural network to be trained, and not on the number and/or types of compute nodes that are configured and provisioned to implement the layers of the artificial neural network in a model parallel configuration.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
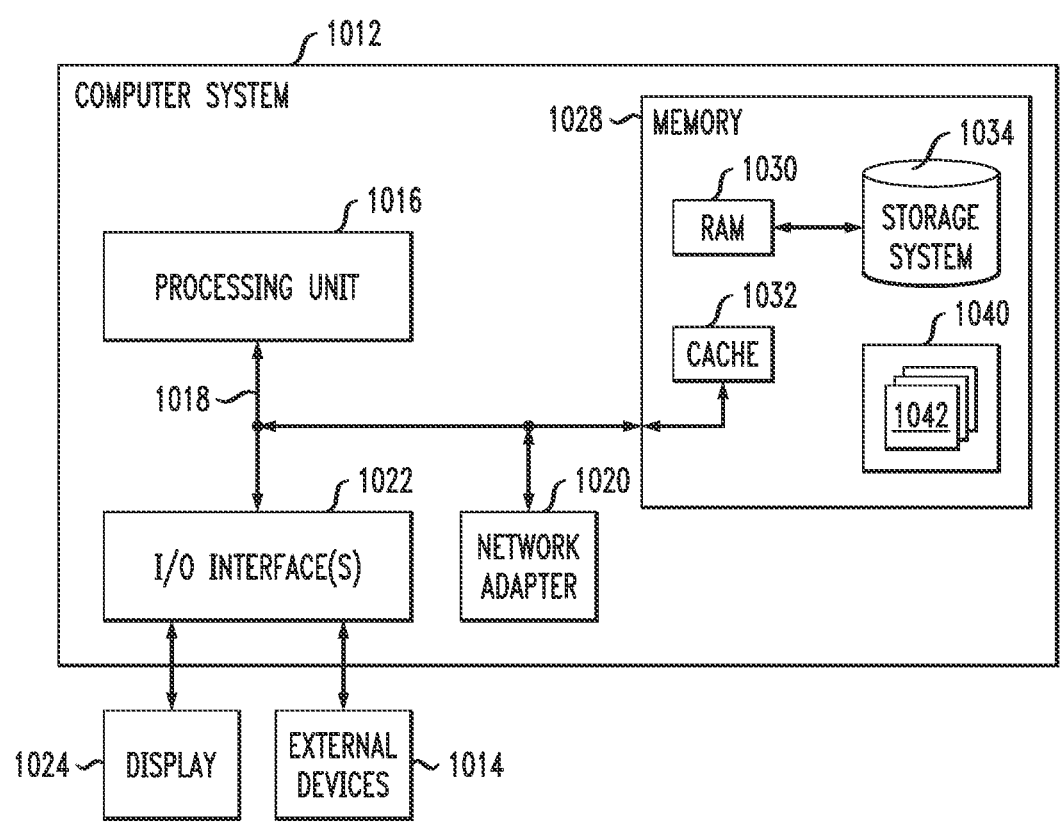
FIG. 10 schematically illustrates an exemplary architecture of a computing node which can host the computing system of FIG. 1, according to an exemplary embodiment of the disclosure.

These concepts are illustrated with reference to FIG. 10, which schematically illustrates an exemplary architecture of a computing node that can host the computing system of FIG. 1, according to an exemplary embodiment of the disclosure. FIG. 10 illustrates a computing node 1000 which comprises a computer system/server 1012, which is operational within numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

In FIG. 10, computer system/server 1012 in computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to the processors 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random-access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As depicted and described herein, memory 1028 may include at least one program product having a set (e.g., at least one) of program modules that are configured to carry out the functions of embodiments of the invention.

The program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the disclosure as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
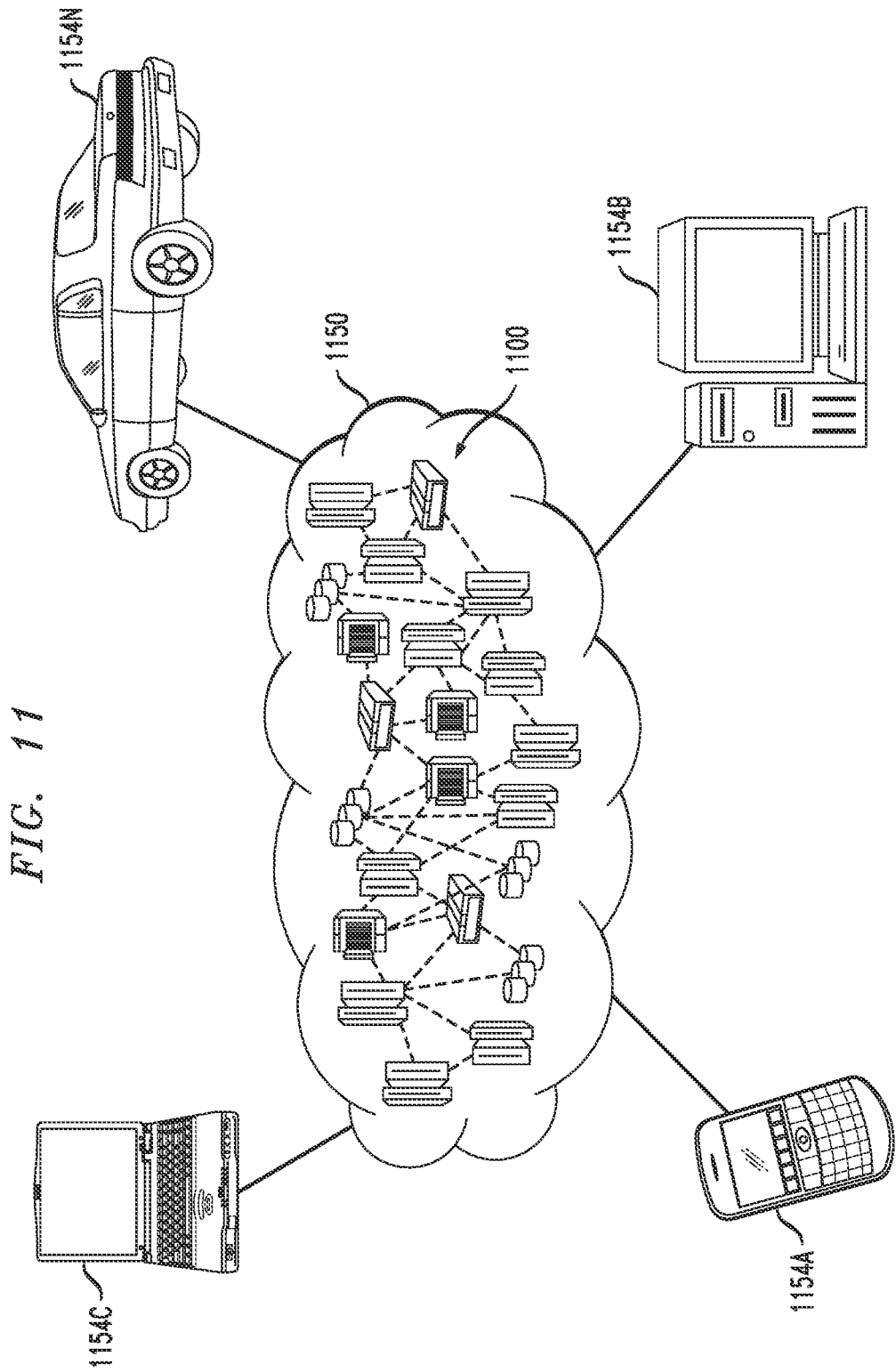
FIG. 11 depicts a cloud computing environment according to an exemplary embodiment of the disclosure.

Referring now to FIG. 11, illustrative cloud computing environment 1100 is depicted. As shown, cloud computing environment 1100 includes one or more cloud computing nodes 1150 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1150 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1150 and cloud computing environment 1100 can communicate with any type of computerized device over any type of network and/or network addressable connection (e.g., using a web browser).

Figure 12:
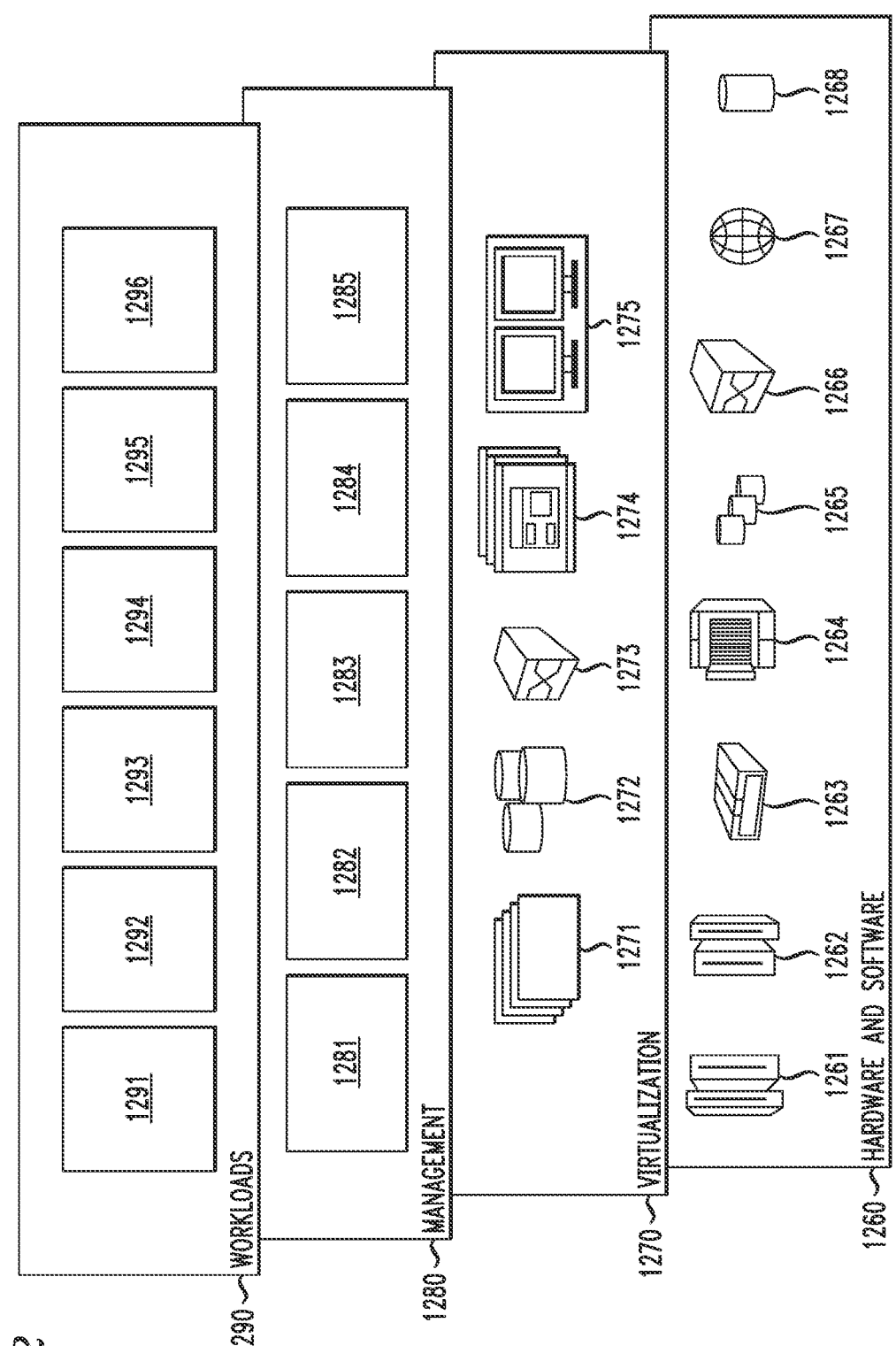
FIG. 12 depicts abstraction model layers according to an exemplary embodiment of the disclosure.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and various functions 1296 for configuring a plurality of nodes to implement a model parallel artificial neural network configuration, and perform pipeline model parallel training process using exemplary systems and method as discussed above in conjunction with, e.g., FIGS. 1-9. Furthermore, in some embodiments, the hardware and software layer 1260 would include, e.g., the computing system 100 of FIG. 1 to implement or otherwise support the various workloads and functions 1296 for performing such hardware accelerated computing and analog in-memory computations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    compute nodes operatively coupled to a communications network, each compute node comprising processor circuitry and a local memory; and
    wherein portions of the local memory of each compute node are pooled to provide an extended memory which comprises a global virtual address space which is shared by the processor circuitry of the compute nodes;
    wherein the processor circuitry of the compute nodes communicate over the communications network to perform a pipeline parallel computation process and utilize the extended memory to exchange data over the communications network to perform the pipeline parallel computation process; and
    wherein in performing the pipeline parallel computation process, data generated by the processing circuitry of a first compute node performing a respective first computation is stored in the extended memory and accessed and utilized by the processing circuitry of a second compute node to perform a respective second computation.

2. The system of claim 1, wherein the processor circuitry of the compute nodes comprise resistive processing units.

3. The system of claim 1, wherein the processor circuitry of the compute nodes comprise a set of heterogeneous hardware accelerator devices comprising at least resistive processing units and graphics processing units.

4. The system of claim 1, wherein:
    the compute nodes implement an artificial neural network in a model parallel configuration; and
    the pipeline parallel computation process comprises a pipeline model parallel training process to train the artificial neural network.

5. The system of claim 4, wherein each compute node performs computations of at least one layer of the artificial neural network.

6. The system of claim 1, wherein in performing the pipeline parallel computation process, the first compute node sends a global virtual address pointer to the second compute node, which points to a global virtual address of the extended memory which comprises the data stored in the extended memory by the first compute node, to enable the second compute node to access the data from the extended memory.

7. The system of claim 1, wherein the extended memory comprises a plurality of buffers to store the data which is exchanged between the processor circuitry of the compute nodes, wherein each buffer comprises an allocated range of global virtual addresses of the global virtual address space.

8. The system of claim 1, wherein the extended memory enables data read operations and data write operations by the processor circuitry of the compute nodes using global virtual address pointers.

9. The system of claim 1, wherein the system comprises a scalable system in which a number of the compute nodes are scalable independent of executable program code for performing the pipeline parallel computation process, and independent of the global virtual address space of the extended memory.

10. A computer program product, comprising:
    one or more non-transitory computer readable storage media, and program instructions collectively stored on the one or more non-transitory computer readable storage media, the program instructions comprising:
    program instructions to configure compute nodes to perform a pipeline parallel computation process, wherein the compute nodes are distributed over a communications network, each compute node comprising a hardware accelerator device and a local memory; and
    program instructions to configure an extended memory comprising a global virtual address space which is shared by the compute nodes, the extended memory comprising a virtual memory pool which comprises at least a portion of each local memory of each compute node;

wherein the extended memory is configured to enable the compute nodes to exchange data over the communications network when the compute nodes perform the pipeline parallel computation process; and wherein in performing the pipeline parallel computation process, data generated by a first compute node performing a respective first computation is stored in the extended memory and accessed and utilized by a second compute node to perform a respective second computation.

11. The computer program product of claim 10, wherein the hardware accelerator devices of the compute nodes comprise resistive processing unit devices, and wherein the program instructions to configure the compute nodes comprise program instructions to configure the resistive processing unit devices of the compute nodes to perform the pipeline parallel computation process.

12. The computer program product of claim 10, wherein the hardware accelerator devices of the compute nodes comprise a set of heterogeneous hardware accelerator devices comprising at least resistive processing unit devices and graphics processing unit devices, and wherein the program instructions to configure the compute nodes comprise program instructions to configure the set of heterogeneous hardware accelerator devices of the compute nodes to perform the pipeline parallel computation process.

13. The computer program product of claim 10, wherein:
the compute nodes are configured to implement an artificial neural network in a model parallel configuration; and
the pipeline parallel computation process comprises a pipeline model parallel training process to train the artificial neural network.

14. The computer program product of claim 13, wherein each compute node is configured to perform computations of at least one layer of the artificial neural network.

15. The computer program product of claim 10, wherein in performing the pipeline parallel computation process, the first compute node is configured to send a global virtual address pointer to the second compute node, which points to a global virtual address of the extended memory which comprises the data stored by the first compute node, to enable the second compute node to access the data from the extended memory.

16. The computer program product of claim 10, wherein the program instructions to configure the extended memory comprise:

program instructions to provision a plurality of buffers, wherein each buffer comprises an allocated range of global virtual addresses of the global virtual address space; and program instructions to enable data read and data write operations of the buffers by the compute nodes using global virtual address pointers.

17. The computer program product of claim 10, further comprising program instructions to scale a number of the compute nodes independent of executable program code for performing pipeline parallel computation process, and independent of the global virtual address space of the extended memory.

18. A method comprising:

configuring compute nodes to perform a pipeline parallel computation process, wherein the compute nodes are distributed over a communications network, each compute node comprising a hardware accelerator device and a local memory; and configuring an extended memory which comprises a global virtual address space that is shared by the compute nodes, the extended memory comprising a virtual memory pool which comprises at least a portion of each local memory of each compute node;

wherein the extended memory is configured to enable the compute nodes to exchange data over the communications network when the compute nodes perform the pipeline parallel computation process; and wherein in performing the pipeline parallel computation process, data generated by a first compute node performing a respective first computation is stored in the extended memory and accessed and utilized by a second compute node to perform a respective second computation.

19. The method of claim 18, wherein the hardware accelerator devices of the compute nodes comprise resistive processing unit devices, and wherein configuring the compute nodes comprises configuring the resistive processing unit devices to perform the pipeline parallel computation process.

20. The method of claim 18, wherein:
the compute nodes are configured to implement an artificial neural network in a model parallel configuration; and
the pipeline parallel computation process comprises a pipeline model parallel training process to train the artificial neural network.

\* \* \* \* \*